United States Patent
Okubo

(10) Patent No.: US 6,814,306 B1
(45) Date of Patent: Nov. 9, 2004

(54) WATER FEEDER WITH MIXED SOLUTION SUSTAINED-RELEASING FUNCTION

(76) Inventor: Takayasu Okubo, 3-1-907, Sumiregaoka 2-chome, Takarazuka-shi, Hyogo 665-0847 (JP)

(*) Notice: Subject to any disclaimer, the term of this patent is extended or adjusted under 35 U.S.C. 154(b) by 326 days.

(21) Appl. No.: 10/048,814

(22) PCT Filed: Aug. 2, 2000

(86) PCT No.: PCT/JP00/05184

§ 371 (c)(1),
(2), (4) Date: Feb. 1, 2002

(87) PCT Pub. No.: WO01/08539

PCT Pub. Date: Feb. 8, 2001

(30) Foreign Application Priority Data

Aug. 3, 1999 (JP) ............................................. 11-250553

(51) Int. Cl.[7] .............................. B05B 7/26; B05B 7/28; B05B 1/34; B05B 7/02; B05B 9/01
(52) U.S. Cl. ........................ 239/316; 239/315; 239/310; 239/463; 239/525; 137/268
(58) Field of Search ................................ 237/316, 315, 237/310, 375, 398, 399, 403, 463, 525; 137/268; 222/129, 168; 366/168.2

(56) References Cited

U.S. PATENT DOCUMENTS

| | | | | |
|---|---|---|---|---|
| 2,064,178 A | * | 12/1936 | Pickard | ....................... 422/278 |
| 3,018,969 A | * | 1/1962 | Gentry | ......................... 239/312 |
| 4,211,368 A | * | 7/1980 | Legros et al. | ................ 239/315 |
| 4,294,280 A | | 10/1981 | Tom | |
| 4,634,053 A | * | 1/1987 | Herzfeld et al. | ............ 239/315 |
| 6,343,750 B1 | | 2/2002 | Engel | |

FOREIGN PATENT DOCUMENTS

| | | |
|---|---|---|
| CH | 633 059 | 11/1982 |
| DE | 3309742 A1 | 9/1984 |
| JP | 5-293053 A | 11/1993 |
| JP | 8-228954 A | 9/1996 |
| JP | 9-187681 A | 7/1997 |
| JP | 10-276926 A | 10/1998 |

* cited by examiner

Primary Examiner—Michael Mar
Assistant Examiner—Darren Gorman
(74) Attorney, Agent, or Firm—Frishauf, Holtz, Goodman & Chick, P.C.

(57) ABSTRACT

A feed device is provided which can release a mixing solution in a suitable amount in correspondence with a flow rate of running water to thereby use the mixing solution efficiently so that the service life and exchange period of a cartridge can be prolonged. The feed device includes a body having a supply channel and a cartridge provided in the body. The cartridge includes a holding chamber for holding a mixing solution and a dilution chamber. The dilution chamber communicates with the supply channel through a sustained release outlet, and is supplied with the mixing solution from the holding chamber. When water passes through the supply channel, the mixing solution supplied to the dilution chamber is diluted with from the sustained release outlet. The mixing solution diluted to a uniform low concentration is sustainedly released from the dilution chamber through the sustained release outlet to the supply channel.

33 Claims, 7 Drawing Sheets

F I G. 7
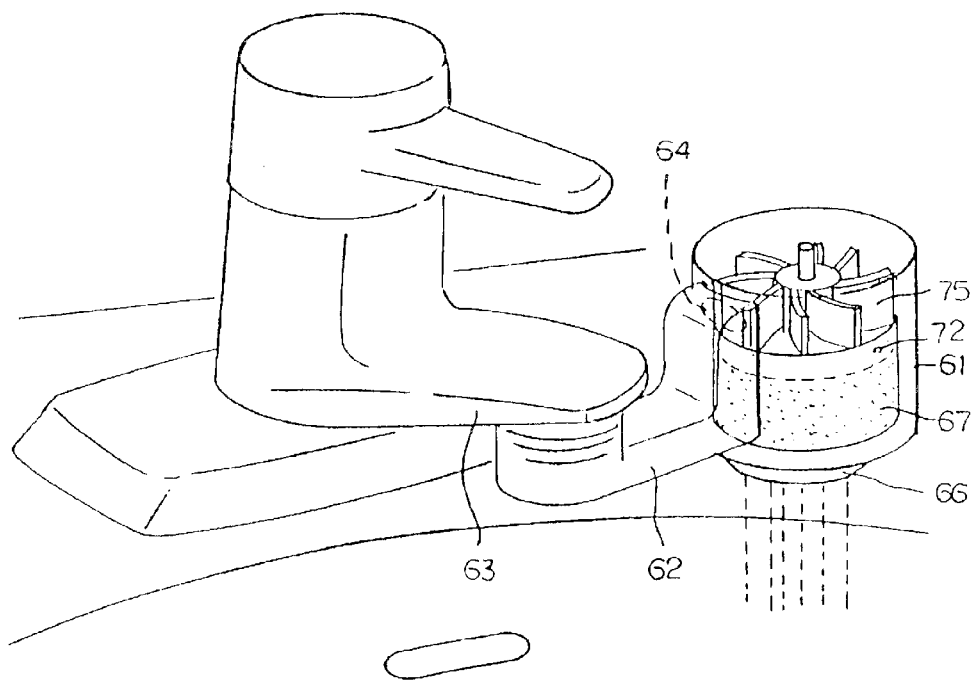

WATER FEEDER WITH MIXED SOLUTION SUSTAINED-RELEASING FUNCTION

This application is a U.S. National Phase Application under 35 USC 371 of International Application PCT/JP00/05184 (not published in English) filed Aug. 2, 2000.

TECHNICAL FIELD

The present invention relates to a feed device applied to a showerhead installed in a bathtub or washroom, a feed instrument installed to a bibcock in a bathtub, washroom or kitchen and so forth. More specifically, the present invention relates to a feed device for feeding mixed water prepared by mixing supplied running water (including a case of hot water) with a mixing solution containing a chlorine neutralizing agent and a fragrant, a weak oxidizer, a weak alkalizing agent, a skin cosmetic water, a bathing agent, a humectant, a shampoo or the like by a small amount at a time.

BACKGROUND ART

It is obliged to mix running water with chlorine in order to sterilize and disinfect saprophytic bacteria and, according to the Water Works Law of Japan, it is prescribed that the running water that is released from a bibcock must contain 0.1 ppm or more of residual chlorine. In particular, there is a recent trend that the water quality of a water source such as a river is increasingly deteriorated. In addition, *Escherichia coli* 0–157 and so forth have emerged. In consideration of these situations, a large amount of chlorine has been introduced for sterilizing the raw water. Therefore, a considerable amount of residual chlorine is contained in the running water that comes out of a bibcock.

However, the residual chlorine contained in running water (in particular, free residual chlorine such as hypochlorous acid, HOCl) is said to give adverse influences on human skin and hair to cause the phenomenon of senescence of skin, decoloration, drying or falling of scalp hair. Especially, it is said that the residual chlorine has a great influence on people having a diathesis of weak skin and on nurslings and that it has an adverse effect on people having a damage in the skin, such as atopic dermatitis.

Under the circumstances, showerheads having the function of neutralizing residual chlorine contained in running water have recently been developed and patent applications have already been filed thereon (JP-A-5-293053, JP-A-9-187681, JP-A-10-276926 and so forth). In the showerhead with the function of dechlorination, a cartridge containing a chlorine neutralizing agent such as calcium sulfite or L-ascorbic acid (hereinafter, referred to as vitamin C) is attached to a handle part or a head part that constitutes the showerhead in order to mix running water flowing in the showerhead with an aqueous solution of the above-mentioned chlorine neutralizing agent through a sustained release outlet formed in the cartridge. The showerhead of this type can convert residual chlorine into an innoxious chlorine compound by a reaction between the chlorine neutralizing agent and the residual chlorine contained in the running water so that the neutralized water (or hot water) can be released from spray holes at the distal end of the head part.

In the case of the above-mentioned patent publications, powder of vitamin C has been already contained in the cartridge and a part of running water that flows in the showerhead is introduced into the cartridge through the sustained release outlet to dissolve the powder of vitamin C in the cartridge. Then the aqueous solution is fed through the above-mentioned sustained release outlet to the running water flowing in the showerhead to be mixed.

Incidentally, for example, when powder of vitamin C is used as a chlorine neutralizing agent, it is believed that there occurs a chemical reaction set forth below between the vitamin C (chemical formula $C_6H_8O_6$, molecular weight 176) and hypochlorous acid (chemical formula HOCl, molecular weight 52.45), which is a main component of the free residual chlorine.

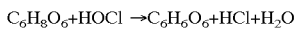
$$C_6H_8O_6 + HOCl \rightarrow C_6H_6O_6 + HCl + H_2O$$

That is, 1 mole of vitamin C (L-ascorbic acid) reacts with 1 mole of hypochlorous acid to produce 1 mole of dehydroascorbic acid ($C_6H_6O_6$), 1 mole of hydrochloric acid (HCl), and 1 mole of water ($H_2O$). That is, 176 g of vitamin C powder reacts with 52.45 g of hypochlorous acid. In other words, 3.35 g of vitamin C powder is required for converting 1 g of hypochlorous acid into innoxious hydrochloric acid.

Therefore, for example, in the case where 10 g of vitamin C powder is packed in a cartridge, about 3 g of hypochlorous acid can be neutralized therewith assuming that the above-mentioned chemical reaction is performed ideally. If running water has a hypochlorous acid concentration of 1.0 ppm, about 3,000 liters (3 tons) of running water can be treated. If the running water having a hypochlorous acid concentration of 1.0 ppm is flown in the supply channel of a showerhead in a rate of 10 liters per minute, the neutralization treatment of chlorine can be continuously performed for about 300 minutes. In other words, if it is intended to treat running water having a hypochlorous acid concentration of 1.0 ppm in a rate of 10 liters per minute, it may be sufficient to continuously feed 0.033 g per minute of powder of vitamin C.

However, 0.033 g of powder of vitamin C is an extremely small amount and an extremely high precision control of sustained release amount is required in order to continuously release that amount over 1 minute dispersedly.

On the other hand, powder or granules of vitamin C when dissolved in water reach saturation at a concentration of 25 to 30%. That is, 0.033 g of vitamin C when it is converted into a saturated aqueous solution amounts approximately 0.08 to 0.1 ml. In the case where it is intended to treat running water having a hypochlorous acid concentration of 1.0 ppm in a rate of 10 liters per minute, it is only necessary to release 0.08 to 0.1 ml per minute in the case of a saturated aqueous vitamin C solution.

However, also in the case where such a minute amount of aqueous solution is constantly released by only 0.08 to 0.1 ml per minute, it is very difficult to control the sustained release amount of aqueous solution since the sustained release amount concerned is an extremely minute amount.

Conventionally, the sustained release outlet formed in a cartridge is 4 mm to 5 mm or more in diameter, so that the aqueous vitamin C solution is released more than the requisite amount. That is, vitamin C is overly released, which results in an excessive consumption. As a result, there arises an inconvenience such that vitamin C must be replenished frequently or the period for exchanging the cartridge is shortened.

To cope with this, controlling the release amount of aqueous vitamin C solution by reducing the area of opening of the sustained release outlet might be considered. However, an effort for downsizing the sustained release outlet is limited in consideration of processing technology. Accordingly, it has been extremely difficult to evenly release 0.08 to 0.1 ml per minute of an aqueous vitamin C solution to the supply channel in a showerhead.

On the other hand, vitamin C powder has a specific gravity of approximately 1.65 and its saturated aqueous solution has a specific gravity on the order of 1.1. That is, the powder or aqueous solution is heavier than water so that it tends to sediment to the lower part of the cartridge in the state where the cartridge is filled with water. As a result, in the case where the showerhead is continuously used in the same posture or hung on a wall-hung hook, the powder in the cartridge is deposited on the bottom and the aqueous solution creates a difference in concentration between upper and lower portions thereof.

In this state, a problem arises in that the concentration of aqueous vitamin C solution supplied from the sustained release outlet fluctuates so that it is difficult to constantly release 0.08 to 0.1 ml per minute of aqueous vitamin C solution as described above.

DISCLOSURE OF THE INVENTION

An object of the present invention is to provide a feed device having a function of sustained release for a mixing solution that can release the mixing solution in a suitable amount in correspondence with the flow rate of running water to thereby resolve excessive feed or deficiency of the mixing solution so that the mixing solution can be efficiently mixed with running water without a loss.

To achieve the above-mentioned object, the present invention provides a feed device having a function of sustained release for a mixing solution, comprising: a feed body having an inlet, an outlet, and a supply channel between the inlet and outlet; a solution holding chamber for holding a mixing solution to be mixed with water flowing in the supply channel; and a dilution chamber communicated with the solution holding chamber to introduce the mixing solution from the solution holding chamber, and having a sustained release outlet communicated with the supply channel, whereby the dilution chamber introduces a part of the water flowing in the supply channel through the sustained release outlet to dilute the mixing solution therein with the introduced water into a lower concentration, and feeds the lower concentration solution through the sustained release outlet to the supply channel.

Here, the mixing solution may contain a chlorine neutralizing agent and a fragrant, a weak oxidizer, a weak alkalizing agent, a skin cosmetic water, a bathing agent, a humectant, a shampoo or the like. In short, it may be any solvent that can be used by mixing it with running water. The form of the mixing solution when it is held in the solution holding chamber may be one that has already been in a liquid state as a high concentration solution, such as a stock solution that can be diluted with water. Alternatively, it may be in the form of powder, granules or pellets that can produce a mixing solution by dissolution in water (or hot water).

In the above construction, when water (that may be hot water) is flown in the supply channel, a part of the water flows into the dilution chamber. At the same time, the mixing solution in the dilution chamber is released through the sustained release outlet to the supply channel. As a result, in the dilution chamber, the mixing solution is released to the outside in a suitable amount in response to the introduced amount of water from the outside. In the dilution chamber, the concentration of the solution therein is decreased in accordance with the increase of the replaced amount of water. Further, the lower concentration solution in the dilution chamber flows into the solution holding chamber due to the effect of diffusion and at the same time the solution having a higher concentration in the solution holding chamber enters the dilution chamber. That is, in the dilution chamber, the higher concentration solution is mixed with the decreased concentration solution and water from the outside to form a suitable low concentration solution. As a result, the higher concentration solution in the solution holding chamber is diluted in the dilution chamber and the diluted low concentration aqueous solution is fed to the supply channel through the sustained release outlet.

It should be noted that in the case where the powder or granules are held in the solution holding chamber in excessive amounts, the mixing solution can maintain a high concentration in the solution holding chamber, that is, the mixing solution is replenished, since the powder or granules are dissolved until the mixing solution comes into a saturation state in spite of a decrease in the concentration of the mixing solution.

In the case where the mixing solution is released to the supply channel in a high concentration state as has been conventionally practiced, the release amount must be controlled to a minute amount and, for this reason, the opening of the sustained release outlet must be processed so as to have a very small size. In contrast, in the present invention, the mixing solution may be diluted in the dilution chamber to increase the release amount of the solution, and the opening of the sustained release outlet may be increased to increase the release amount. Accordingly, the dilution as described above enables the feed device to mix the mixing solution with running water in an optimal amount with respect to the flow rate of running water without extremely decreasing the area of opening of sustained release outlet. As a result, the sustained release outlet can be processed more easily.

It should be noted that the dilution chamber might be constructed such that it comprises a plurality of dilution chambers in a multistage state and the higher concentration solution may be gradually diluted by passing through respective dilution chambers.

According to a preferred embodiment of the present invention, the solution holding chamber and the dilution chamber are partitioned by a partition plate that permeates water. This construction can create a conspicuous difference in concentration between the concentrations of solution in the solution holding chamber and the dilution chamber. Further, in the case where excessive powder, granules, or pellets are held in the solution holding chamber, the powder, granules or pellets do not enter the dilution chamber, so that no clogging of sustained release outlet occurs.

According to another preferred embodiment, the solution holding chamber, the dilution chamber, and the sustained release outlet are defined in an integral component or integrally assembled in order to form a cartridge. Detachably attaching the cartridge to the body of the feed device facilitates replenishment in case where the mixing solution is consumed and none of it remains. Alternatively, it is possible to exchange the cartridge as a whole.

According to a further preferred embodiment, at least one of the solution holding chamber and the dilution chamber is provided with a stirring mechanism for stirring the mixing solution held inside.

In such a case, the mixing solution in the solution holding chamber and/or the dilution chamber is stirred, so that the concentration of the solution in the chambers is made uniformly, with the result that the mixing solution can be released at a regular concentration from the sustained release outlet.

On the other hand, according to another invention for achieving the above-mentioned object, there is provided a feed device having the function of releasing a mixing solution, comprising a feed body having an inlet, an outlet and a supply channel between the inlet and outlet, a cartridge for holding a mixing solution to be mixed with water flowing in the supply channel, the cartridge having a sustained release outlet communicated with the supply channel so that the sustained release outlet introduces a part of the water flowing in the supply channel in the cartridge and feeds the mixing solution in the cartridge into the supply channel, and a stirring mechanism for stirring the mixing solution held in the a cartridge.

With this construction, the mixing solution in the cartridge is stirred by the stirring mechanism so that the concentration of the solution in the cartridge can be made uniformly. This in turn makes uniform the concentration of the aqueous solution released from the sustained release outlet.

It should be noted that the above-mentioned other invention might include a feed device having no dilution camber.

In various preferred embodiments, it is desirable that the cartridge is detachably attached in the supply channel. With this construction, the cartridge does not protrude out of the feed device body and is not an obstacle when in use and in addition the appearance is simplified.

A stirring mechanism according to a preferred embodiment is characterized by comprising means for giving rotational movement to a mixing solution in the solution holding chamber or dilution chamber, or in the cartridge by use of flow energy of the water flowing in the supply channel and a rotational resistance means for giving rotational resistance to a part of the rotated mixing solution.

In the case of such a construction, the mixing solution in the solution holding chamber, dilution chamber or cartridge is rotated during the water supply so that the solution is given a rotational movement and at the same time the rotation resistance means gives a resistance to a part of rotation of the mixing solution. That is, the rotation resistance means creates an effect of partially preventing the rotation of the mixing solution to generate a disturbance in the rotation of the solution. As a result, turbulence occurs in the rotated mixing solution so that the solution is stirred.

The means for giving a rotational movement to the mixing solution as described above preferably comprises a driving rotor rotated by the flow energy of the water flowing in the supply channel, and a driven rotor rotated in the solution holding chamber, dilution chamber or cartridge along with the rotation of the driving rotor, in which the rotation of the driven rotor gives a rotation to the mixing solution itself. In this case, the driving rotor is rotated by the energy of the water that flows in the supply channel and the driven rotor along with the driving rotor is rotated in the solution holding chamber, dilution chamber or cartridge, with the result that the mixing solution is rotated.

Preferably, an another means for giving a rotational movement to the mixing solution cause the solution holding chamber, dilution chamber or cartridge itself to be rotated by all or a part of the water flowing in the supply channel so that the rotation of the mixing solution holding chamber, dilution chamber or cartridge gives the mixing solution a follow-up rotation.

In this case, the mixing holding chamber, dilution chamber or cartridge itself rotates by use of the energy of the water that flows in the supply channel. This rotation drags the mixing solution inside and finally the mixing solution rotates together with the solution holding chamber, dilution chamber or cartridge unitarily.

The means for rotating the cartridge desirably comprises a swirling flow generation mechanism for generating a swirling flow in the supply channel by use of the flow energy of the water flowing in the supply channel, and receiving vanes provided in the cartridge, the receiving vanes causing the cartridge itself to rotate by receiving the swirling flow.

In the case of such a construction, the structure allows the supply water to generate a swirling flow and causes the cartridge to be rotated by receiving the swirling flow, so that the structure for rotating the cartridge can be simplified. In particular, in the case of an exchangeable cartridge, the structure of the cartridge can be simplified to make its production at low costs.

Preferably, the rotation resistance means for giving a rotation resistance to a part of the rotated mixing solution comprises a magnetic material or magnet movably held in the cartridge, and a magnetic material or magnet fixed to the feed body. When the mixing solution in the cartridge rotates, the magnet or magnetic material on the side of the feed body and the magnet or magnetic material in the cartridge attract or repel each other due to the action of a magnetic force so that the magnet or magnetic material in the cartridge may not follow the rotation of the mixing solution.

It should be noted that the magnet and magnetic material might be basically arranged in which magnetic force acts to each other. This arrangement may include the case where both are magnets or the case where one is a magnet and the other is a magnetic material.

In the case of such a construction as described above, when the mixing solution in the cartridge rotates, the magnet or magnetic material on the side of the feed body and the magnet or magnetic material in the cartridge attract or repel each other to prevent the magnet or magnetic material in the cartridge from being taken around to follow the rotation of the mixing solution. As a result, an obstacle exists in the cartridge and this stirs the rotating mixing solution. Therefore, the difference in concentration in the solution in the cartridge cannot be produced.

In each embodiment of the present invention, it is preferred that the specific gravity of the mixing solution be greater than that of water. Also, it is preferred that the sustained release outlet is formed in an upper position of the dilution chamber or cartridge in a posture when the water supply is stopped and a feed device is not used.

Here, the posture when the water supply is stopped and the device is not used refers to the case, for example, where a showerhead with the feed device is engaged with a wall-hung hook. Alternatively, in the case of a bibcock-attached type feed device, it refers to a posture in which the feed device is attached to the bibcock.

In the case of such a construction as described above, when the water supply is stopped and the device is not used, the mixing solution in the cartridge, which tends to come out through the sustained release outlet toward the water in the supply channel due to diffusion, is prevented from vainly leaking since a part of the mixing solution in the cartridge which has a greater specific gravity than that of the other of the mixing solution tends to move downward in the dilution chamber or cartridge, and the sustained release outlet is open in the upper part of the dilution chamber or cartridge.

Furthermore, according to another preferred embodiment, the opening area of the sustained release outlet is set to 1.0 $mm^2$ or less. The smaller is the opening of the sustained release outlet, the more precisely the release amount of the mixing solution held therein can be controlled. From the results of various experiments conducted by the present inventors, it has been confirmed that a suitable release amount in correspondence with the flow rate can be obtained by setting the opening area of the sustained release outlet to 1.0 mm$^2$ or less. It should be noted that the opening area may depend on the concentration of residual chlorine or flow rate in the supply chamber but is more preferably 0.5 mm$^2$ or less and 0.03 mm$^2$ or more. When the opening area is not more than 0.03 mm$^2$, boring processing is difficult.

According to another preferred embodiment of the present invention, powder, granules or pellets, i.e., a source that produces a mixing solution when it is dissolved in water, is held in the solution holding chamber or cartridge. It is desirable that the powder, granules or pellets be dissolved in water to produce a mixing solution.

In such a case as described above, the solution holding chamber or cartridge contains no liquid therein before use, so that no leakage of liquid or the like occurs at the time of transportation, sales or exhibition. Accordingly, it is easy to handle the feed device.

In this case, when the feed device is used for the first time and water is passed through the supply channel, the pressure of water in the supply channel is equal to or more than the atmospheric pressure. As a result, water enters through the sustained release outlet into the solution holding chamber or cartridge, which communicates with the dilution chamber and in which the pressure is increased from atmospheric pressure. As a result, the air in the solution holding chamber or cartridge, which communicates with the dilution chamber, is compressed and discharged out of the sustained release outlet. This causes water to be entered into the solution holding chamber or cartridge so that the mixing agent, which is a source of a mixing solution in the form of powder, granules or pellets, is dissolved in the water.

The powder, granules or pellets, i.e., a source that produces a mixing solution when it is dissolved in water is held desirably in an amount more than the amount which is dissolved by the water initially filled in the solution holding chamber or cartridge.

By containing the powder, granules or pellets in an excessive amount, a large amount of mixing solution can be prepared, so that it can be used for a long period of time.

According to still another embodiment of the present invention, the inside of the solution holding chamber or cartridge can be seen from the outside. Making the inside of the solution holding chamber or cartridge to be seen from the outside allows recognition of the residual amount of the mixing solution or of the powder, granules or pellets from the outside. Accordingly, proper time for replenishment or proper time for exchange can be readily known.

The structure that allows the inside to be seen from the outside is desirably as follows. That is, each of the feed body and the solution holding chamber or cartridge held therein is at least partly transparent, so that the content held therein can be seen from the outside of the feed body. In such a case, the see-through state may be transparent, colored transparent or translucent state and basically may be a state where the inside can be seen from the outside.

The mixing solution is desirably L-ascorbic acid (vitamin C) or ascorbic acids. The L-ascorbic acid or ascorbic acids are excellent in reactivity with chlorine and have been already accredited as food additives so that they are highly safe.

When the present invention is used for a showerhead, the hair can be soaked with a treatment liquid that has been treated with the aqueous solution or a mixing solution. In the case where a showerhead having a handle grip part is used, it is desirable that the cartridge is detachably held in the handle grip part.

Here, the showerhead may be used in every field such as a shower equipment in general homes, inns, hotels, swimming pools, hospitals, beauty parlors, barber shops and so forth. As described above, according to the present invention, the mixing solution having a high concentration is diluted in the dilution chamber before it can be sustainedly released through the sustained release outlet. Therefore, a necessary amount of mixing solvent required in running water can be supplied by increasing the sustained release amount of the aqueous solution that is suitable with respect to the dilution. This makes it easy to process the sustained release outlet so as to have a desired size and enables the sustained release outlet to supply an optimal amount of mixing solution that corresponds to the amount of water supply.

Furthermore, according to the present invention, the aqueous solution in the cartridge can be stirred during water supply to eliminate a difference in concentration so that the concentration of mixing solution to be mixed with running water can be made constant to prevent fluctuation of sustained release amount of the mixing solvent.

From the above, the mixing solvent can be used efficiently, which gives advantages, for example, prolonged service life and exchange period of cartridge.

BRIEF DESCRIPTION OF THE DRAWINGS

FIG. 7 is a perspective view showing a feed instrument according to a fourth embodiment of the present invention.

BEST MODE FOR CARRYING OUT THE INVENTION

"First Embodiment"

Figure 1:
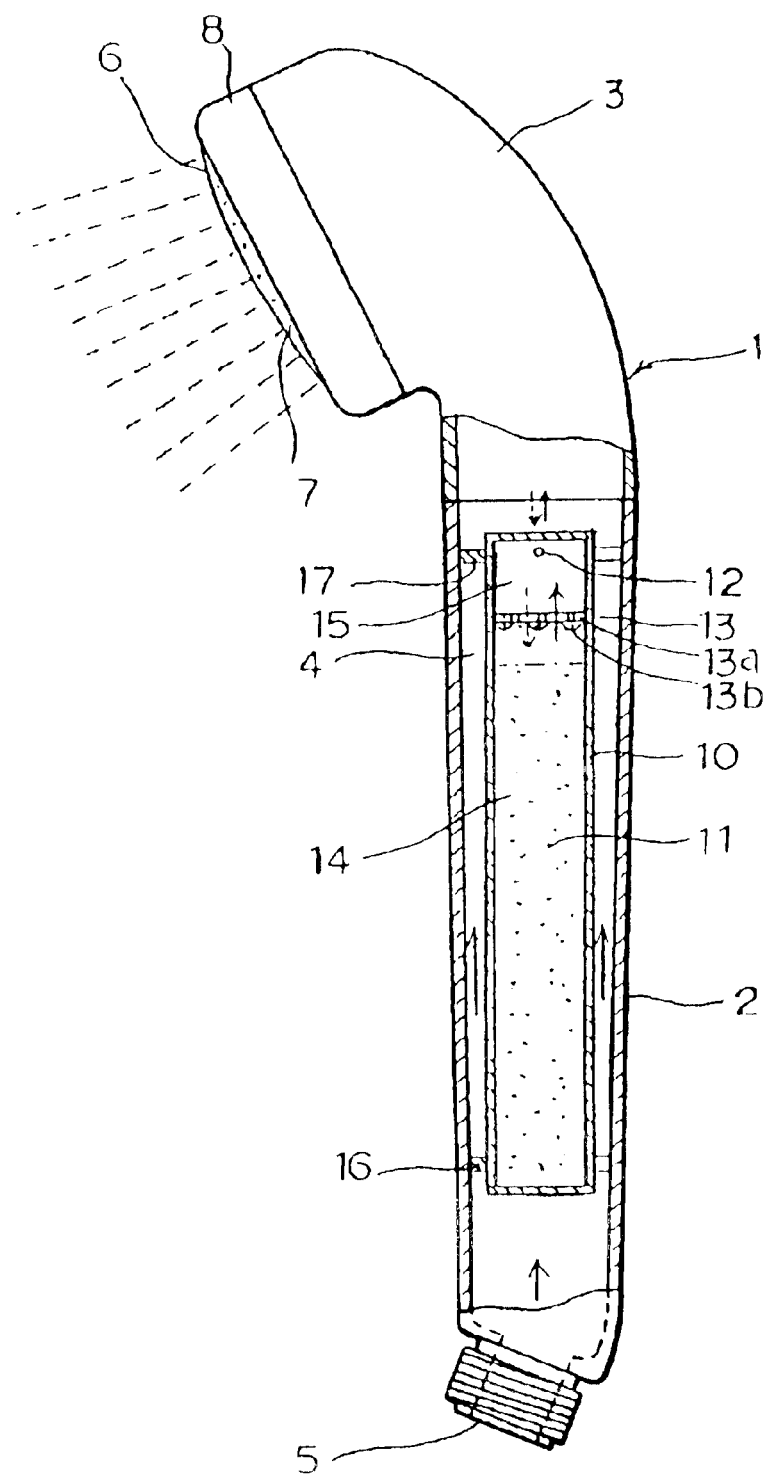
FIG. 1 is a side view showing a showerhead according to a first embodiment of the present invention partly in cross section.

Hereinafter, concerning the present invention, a first embodiment, which is applied to a showerhead, will be illustrated with reference to FIG. 1. FIG. 1 is a side view showing a showerhead partly in cross section.

In FIG. 1, reference numeral 1 designates a body of showerhead having a function of neutralizing chlorine, which is provided with a handle grip part 2 and a head part 3. The handle grip part 2 and the head part 3 are made of a synthetic resin such as ABS resin or polypropylene. In the case of the instant embodiment, the handle grip part 2 and the head part 3 are formed as separate components and are detachably coupled with each other by a means such as a screw or bayonet link, which is not shown.

The handle grip part 2 is transparent and in the form of a hollow cylinder, which has a supply channel 4 defined inside thereof. The supply channel 4 is formed to be connected to a shower hose (not shown) through an inlet 5 at the proximal end thereof.

The inner cavity of the head part 3 is communicated with the supply channel 4 of the handle grip part 2 and has a water spray plate 6 attached to the distal end thereof. The water spray plate 6 has a large number of water spray holes 7 (corresponding to the release outlet in the present invention) distributed in the entire surface thereof through which shower water is discharged. The water spray plate 6 is detachably attached to the head part 3 by use of a tap ring 8.

In the supply channel 4 in the handle grip part 2 is held a cartridge 10. The cartridge 10 is in the form of a cylinder with the both ends being blocked, and is transparent as being made of a synthetic resin, for example, ABS resin or polypropylene, so that the inside can be seen. In the inside of the cartridge 10 is held a mixing solution. In the case of the instant embodiment, L-ascorbic acid (vitamin C) having a chlorine neutralizing effect is held in advance in the form of powder 11 as the mixing solvent. The powder of vitamin C is held in an excessive amount so that the powder is not completely dissolved with water whose amount corresponds to the amount of water filling the cartridge 10 up for the first time when water is poured thereinto. The chlorine neutralizing agent may include besides L-ascorbic acid (vitamin C), sodium L-ascorbate, calcium L-ascorbate, L-ascorbyl magnesium phosphate, calcium sulfite, sodium sulfite and so forth.

On the upper end of the cartridge 10 as shown (the end positioned on the downstream side along the direction of the flow of running water), there is formed a single sustained release outlet 12, for example, on a circumferential side. The sustained release outlet 12 is formed so as to have a very small opening area in which the area is 1.0 mm$^2$ or less and, for example, it has a diameter of 1.0 mm (the opening area in this case being 0.785 mm$^2$) or less.

In the cartridge 10, a water-permeable partition member 13 is provided such that it is positioned in the upper part thereof. The partition member 13 is constituted, for example, by applying a mesh sheet 13b such as nonwoven fabric to a grid-like disk 13a. The partition member 13 partitions the inside of the cartridge 10 into a solution holding chamber 14 in a lower part and a dilution chamber 15 in an upper part. The powder of vitamin C is held in advance in the solution holding chamber 14 to be filled up with. The solution holding chamber 14 and the dilution chamber 15 are arranged such that water and the mixing solution can freely pass them through but the powder of vitamin C is stopped by the mesh sheet 13b and prevented from entering the dilution chamber 15. It should be noted that the sustained release outlet 12 is communicated with the dilution chamber 15.

Holders 16 and 17 hold the both ends of the cartridge 10 of the type described above so that the cartridge 10 is positioned on a central axis of the handle grip part 2. This secures the supply channel 4 for passing running water between the inner peripheral surface of the handle grip part 2 and the outer peripheral surface of the cartridge 10. The holders 16 and 17 have a structure that does not prevent the flow of the water flowing in the supply channel 4. In the case where the handle grip part 2 and the head part 3 are disassembled, the cartridge 10 can be reattachably taken out from the upper end opening of the handle grip 2.

The operation of the showerhead with a function of neutralizing chlorine having the structure as; described above will be illustrated.

In a new showerhead before use, the cartridge 10 contains air that remains therein, and the vitamin C 11 held therein is in the form of powder. When connecting the showerhead body 1 in this state to a shower hose and opening the faucet, running water (or hot water) is supplied to the showerhead 1 through the shower hose. The running water flows through the inlet 5 on the lower end of the handle grip 2 and passes through the supply channel 4 to the head part 3 and is sprayed as shower water through the water spray holes 7 of the water plate 6.

At the time of starting the water supply as described above, the pressure in the cartridge 10 before use is equal to the atmospheric pressure. However, the pressure of running water flowing in the supply channel 4 is higher than the atmospheric pressure so that a part of the water in the supply channel 4 flows into the inside of the cartridge 10 through the sustained release outlet 12. In the cartridge 10, the water that has introduced through the sustained release outlet 12 enters the dilution chamber 15, passes through the water-permeable partition member 13, and flows into the solution holding chamber 14. Since the powder of vitamin C held in the solution holding chamber 14 has a water absorbing property, the powder absorbs the entered water and is dissolved therein immediately. It should be noted that vitamin C has a saturation dissolution concentration on the order of about 25% and even if the cartridge 10 is filled up with water, a part of vitamin C is dissolved and the rest remains in the form of powder.

When water enters into the cartridge 10 through the sustained release outlet 12, the pressure inside the cartridge 10 increases. This causes the remaining air to be compressed. Since air is lighter in weight than water, the compressed air accumulates in the upper part of the cartridge 10, i.e., in the dilution chamber 15. Therefore, the air in the cartridge 10 is automatically and smoothly expelled through the sustained release outlet 12 by forming the sustained release outlet 12 in the upper part of the cartridge 10 and by keeping the showerhead 1 in a posture in which the inlet 5 is directed downward and the head part 3 is directed upward. The expelled air is discharged as entrained by the water through the water spray holes 7 to the outside of the showerhead.

When the water supply is stopped, the water pressure in the supply channel 4 is returned to the atmospheric pressure whereas the pressure in the cartridge 10 still remains at a high pressure, so that the air that remains in the cartridge 10 is further discharged to the supply channel 4 through the sustained release outlet 12 due to the difference in pressure.

In this manner, the air is repelled from the cartridge 10 and, at the same time, the inside of the cartridge 10 is filled with water. As described above, vitamin C has a saturation dissolution concentration on the order of about 25%, so that even if the solution holding chamber 14 is filled up with water, a part of vitamin C is dissolved but the rest remains in the form of powder. The specific gravity of vitamin C is about 1.65 and the specific gravity of its saturated aqueous solution is approximately 1.1 so that the remaining powder sinks to the bottom and also the solution resides near the bottom. That is, the solution having a high concentration is held in the solution holding chamber 14. However, since the solution holding chamber 14 is communicated with the dilution chamber 15, a part of the solution having a high concentration diffuses into the dilution chamber 15. As a result, in the dilution chamber 15, an aqueous solution having a low concentration of vitamin C is pooled.

Next, in the case where a shower is used at the time of bathing or the like, when the faucet is opened to start water supply, a part of the running water that flows in the supply channel 4 is introduced into the dilution chamber 15 through the sustained release outlet 12. At the same time, the aqueous vitamin C solution in the dilution chamber 15 is released to the supply channel 4 through the sustained release outlet 12. Such replacement between the running water and the aqueous vitamin C solution is considered to be attributable to a composite action including diffusion due to a difference in concentration of vitamin C between the aqueous vitamin C solution and running water, a variation in pressure of the running water, and sucking of the aqueous solution from the dilution chamber 15 at a standstill by the water that flows in the supply channel 4, although the phenomenon is not clear enough.

As described above, at the time of water supply, the aqueous vitamin C solution in the dilution chamber 15 is released to the supply channel 4 through the sustained release outlet 12 and the aqueous vitamin C solution is mixed with the running water that flows in the supply channel 4. As a result, free residual chlorine contained in the running water reacts with vitamin C and the residual free chlorine is neutralized into an innoxious chlorine compound, which is discharged together with the running water through the water spray plate 6.

On the other hand, the running water introduced into the dilution chamber 15 is mixed with the aqueous vitamin C solution in the dilution chamber 15 to decrease the concentration of the aqueous vitamin C solution. On this occasion, the aqueous vitamin C solution having a higher concentration in the solution holding chamber 14 permeates the partition member 13 and diffuses into the dilution chamber 15 to replenish the dilution chamber 15 with the aqueous vitamin C solution having a higher concentration. As a result, the aqueous vitamin C solution is maintained at a low concentration in the dilution chamber 15.

Furthermore, the aqueous vitamin C solution having a lower concentration flows into the solution holding chamber 14 from the dilution chamber 15 and lowers the concentration in the solution holding chamber 14. However, in the solution holding chamber 14, there exists the undissolved powder of vitamin C that and this powder is dissolved. That is, in the solution holding chamber 14, vitamin C is continuously dissolved until its saturation dissolution concentration is reached so that the aqueous vitamin C solution having a high concentration is held.

From the above, the aqueous vitamin C solution having a high concentration prepared in the solution holding chamber 14 is supplied to the dilution chamber 15 and is diluted in the dilution chamber 15 and finally, the aqueous solution having a low concentration is released to the supply channel 4 through the sustained release outlet 12.

As described above, in the case where the concentration of the aqueous vitamin C solution is decreased in the dilution chamber 15, assuming that the solution is diluted to, for example, 10 folds, the amount of the solution released through the sustained release outlet 12 to the supply channel 4 in unit time may be set to 10 times the amount of the aqueous solution released in the case where the concentration is not decreased. Therefore, to increase the release amount in unit time, the opening area of the sustained release outlet 12 may be increased.

That is, in the conventional case, the improvement of the technology has been directed toward a reduction in the opening area of the sustained release outlet with a view to releasing an aqueous vitamin C solution having a high concentration only by a minute amount. As a result, the opening area comes to a level at which the processing of the sustained release outlet is impossible. However, preparing a low concentration aqueous solution by diluting the high concentration aqueous solution as described above enables the sustained release outlet 12 to be processed at a practicable level without requiring a difficult technology for reducing the opening area of the sustained release outlet 12.

From the above, the sustained release amount of vitamin C can be controlled to a necessary amount so that excessive release or deficiency can be resolved. Therefore, the total amount of the vitamin C powder filled in the cartridge 10 can be effectively used in the neutralization treatment of residual chlorine contained in running water so that the service life of the cartridge can be prolonged.

It should be noted that when the powder of vitamin C is fully dissolved and used out, an aqueous solution is no longer produced. In this case, the cartridge 10 may be exchanged.

If the opening area of the sustained release outlet 12 is large, the release amount of ascorbic acid is excessive. According to the experiments which the present inventors have conducted, it has been confirmed that the sustained release amount can be controlled by making the opening area of the sustained release outlet 12 as small as possible in a range that allows processing. It has also been revealed that when an opening area is practically 1.0 $mm^2$ or less, a suitable sustained release amount in correspondence with the flow rate can be obtained. Furthermore, it has been revealed that the opening area of the sustained release outlet 12 is desirably 0.5 $mm^2$ to 0.03 $mm^2$.

It should be noted that the opening area of the sustained release outlet 12 of not more than 0.03 $mm^2$ is undesirable since the processing thereof is practically difficult and expulsion of air takes time when the showerhead is used for the first time.

Next, when the water supply is stopped, the water pressure in the supply channel 4 is returned to the atmospheric pressure and the pressure in the cartridge 10 becomes equal to the atmospheric pressure. In this state, the aqueous vitamin C solution in the dilution chamber 15 tends to be released to water in the supply channel 4 due to diffusion. However, the aqueous solution in the dilution chamber 15 is at a low concentration so that diffusion barely occurs, and the opening area of the sustained release outlet 12 is small so that diffusion is prevented.

In addition, if the showerhead is engaged with the wall-hung hook, which is not shown, the showerhead is kept in a posture in which the head part 3 is upward as illustrated, with the result that the sustained release outlet 12 formed in the cartridge 10 is positioned in the upper part of the cartridge 10. In contrast, the aqueous solution in the cartridge 10 has a greater specific gravity than that of water so that it tends to sink to the lower part of the cartridge 10. As a result, the amount of leakage through the sustained release outlet 12 positioned on the upper part is restricted.

Therefore, when the shower is not used, the aqueous vitamin C solution is prevented from leaking from the cartridge 10 to the supply channel 4 and its futile consumption can be restricted.

In the showerhead having such a construction, since the cartridge 10 can be seen through from the outside and also the handle grip part 2 holding the cartridge 10 can be seen through from the outside, the powder 11 of vitamin C held in the cartridge 10 can be seen from the outside. Therefore, the residual amount of vitamin C can be visually confirmed from the outside and hence the cartridge 10 can be exchanged when the residual amount is decreased or null. In this case, the head part 3 is detached from the handle grip part 2 and the cartridge 10 can be exchanged through the upper end opening of the handle grip part 2.

"Second Embodiment"

Figure 2:
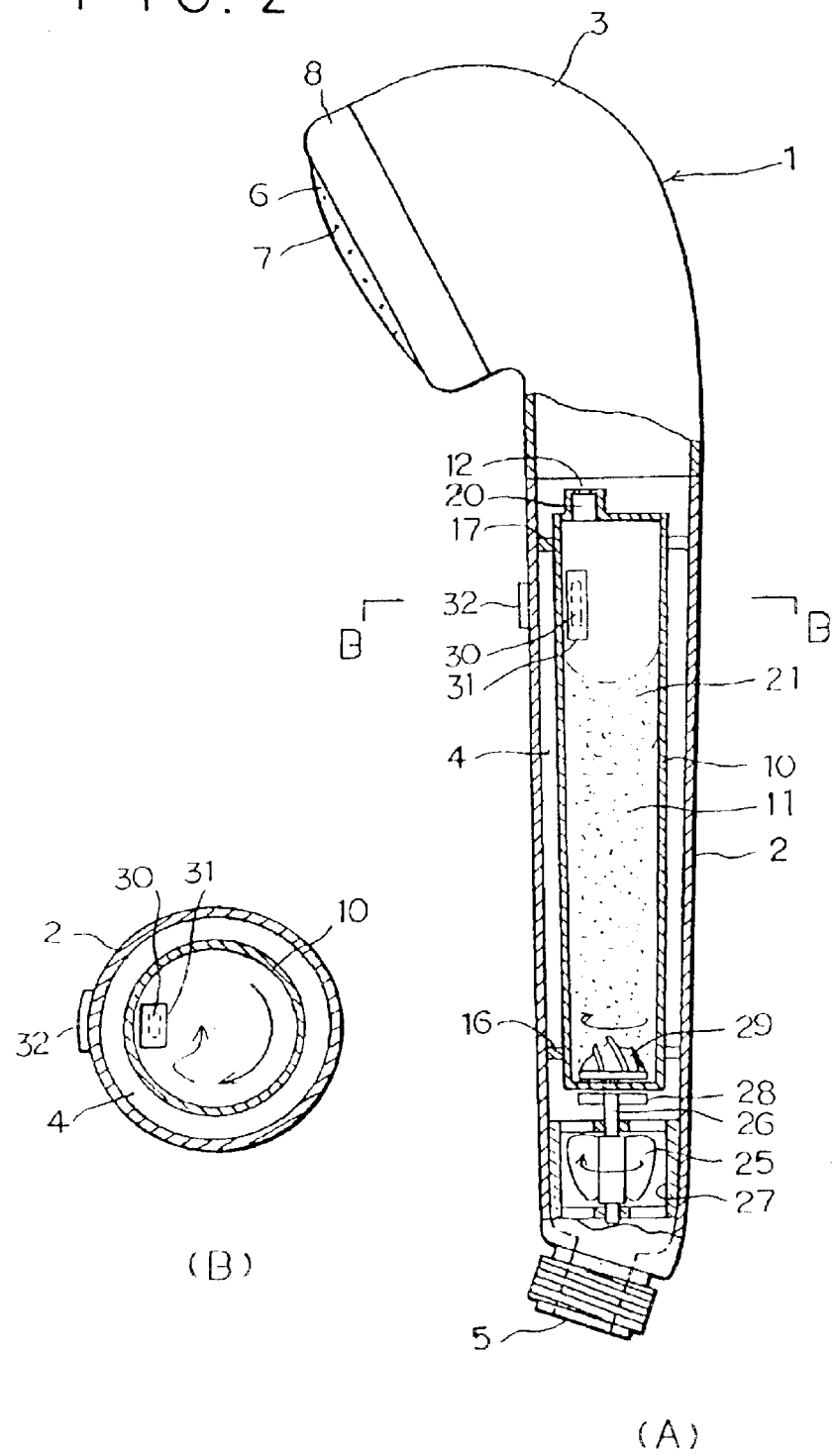
FIG. 2A is a side view showing a showerhead according to a second embodiment of the present invention partly in cross section.
FIG. 2B is a cross-sectional view along the B—B line in FIG. 2A.
Figure 3:
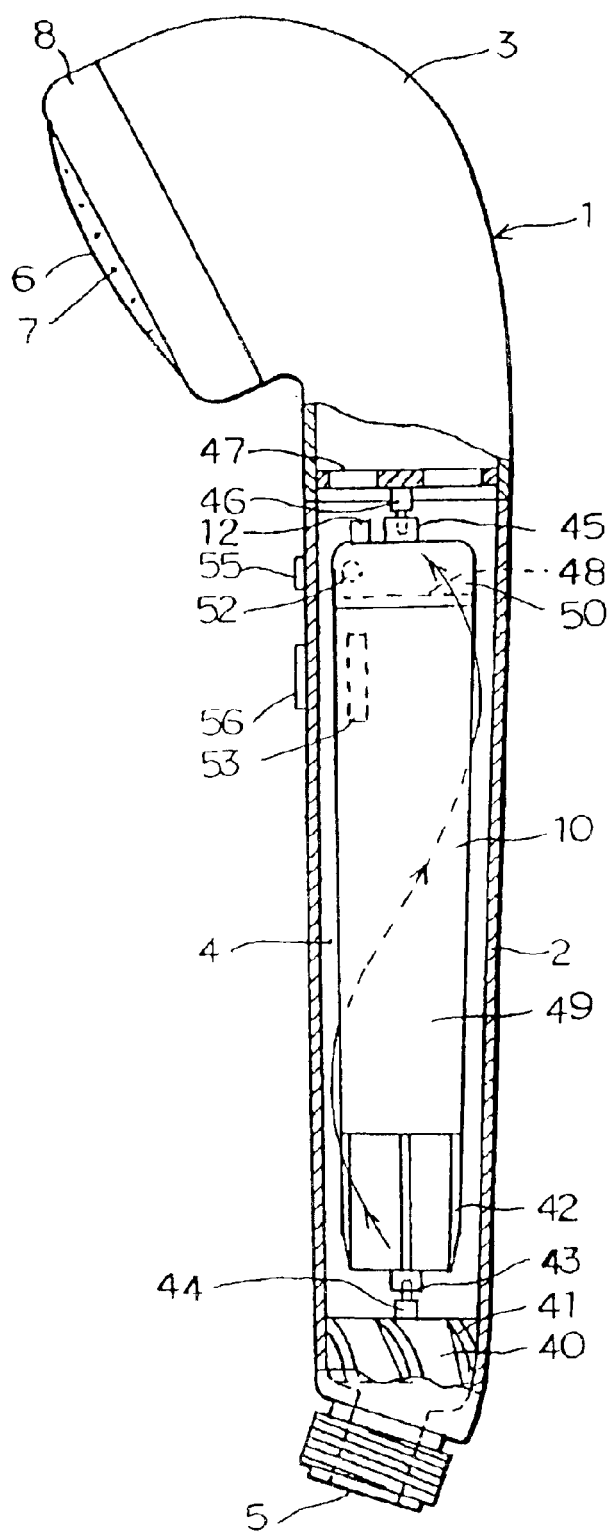
FIG. 3 is a side view showing a showerhead according to a third embodiment of the present invention partly in cross section.
Figure 4:
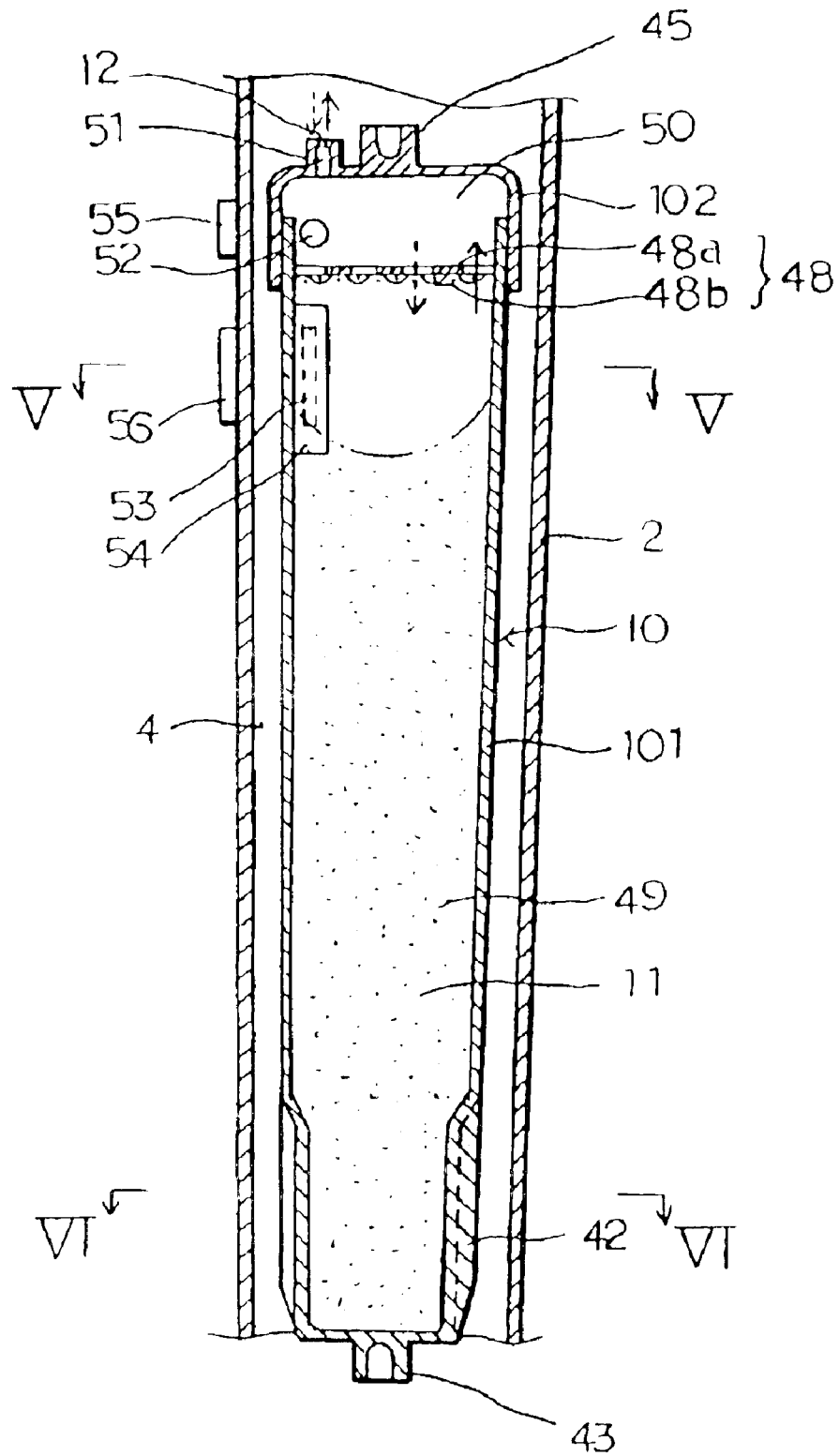
FIG. 4 is a cross-sectional view showing the cartridge of the third embodiment in an enlarged scale.

Next, a second embodiment of the present invention will be illustrated with reference to FIGS. 2A and 2B showing a showerhead to which the present invention is applied.

In FIGS. 2A and 2B, the same or like members as those in FIG. 1 are designated by the same reference numeral and detailed explanation thereof is omitted here. That is, reference numeral 1 designates a showerhead body, 2 designates a handle grip part, 3 designates a head part, 4 designates a supply channel, 5 designates an inlet, 6 designates a water spray plate, 7 designates water spray holes, 8 designates a tap ring, 10 designates a cartridge, 11 designates vitamin C powder, 12 designates a sustained release outlet, and 16 and 17 designate holders.

In the instant embodiment, a small chamber in the form of a cylinder is formed at a position deviating from the center on an upper end surface of the cartridge 10 fixed to the head body 1. The small chamber serves as a dilution chamber 20, which is communicated with the inside of the cartridge 10. Therefore, the inside of the cartridge serves as a solution holding chamber 21 where vitamin C powder 11 is held. The sustained release outlet 12 is formed in an upper end surface of the dilution chamber 20.

In the supply channel 4 of the handle grip part 2 is provided a vane wheel 25 positioned below the cartridge 10 in the drawing (on the upstream side in the direction of the flow). The vane wheel 25 receives the flow of water flowing from the upstream side toward the downstream side in the supply channel 4 to rotate, and the number of revolutions thereof varies according to the flow rate of running water varies. It should be noted that the vane wheel 25 is not limited in the shape of vanes and basically its shape and structure do not make any distinction as long as it is rotated by the flow of water. A rotating shaft 26 of the vane wheel 25 is rotatably attached to a bearing holder 27 that forms a frame structure. The bearing holder 27 is fixed to an inner surface of the handle grip part 2 by use of press fitting, adhesion or other means.

On the upper end of the rotating shaft 26 is attached a driving side rotary magnet 28. The rotary magnet 28 comprises a disk-shaped magnet or a disk having a magnet attached thereto, and the like. The rotary magnet 28 rotates unitarily together with the vane wheel 25. The rotary magnet 28 is opposed to a lower end surface of the cartridge 10 at a minute gap therefrom. On the other hand, in the lower position in the cartridge 10, a driven side vane wheel 29 is rotatably held. The vane wheel 29 is formed of a disk-shaped magnet or a disk having a magnet attached thereto at its lower surface and is constructed such that when the rotary magnet 28 rotates, the vane wheel 29 follows and rotates due to a mutual magnetic force action.

Furthermore, an inner magnet 30 as a rotation preventing means is held in the cartridge 10 in such a manner that the inner magnet 30 can freely move therein. The inner magnet 30 is attached to a float 31 and is suspended in the aqueous solution in the cartridge 10 due to a buoyant force. On the other hand, another magnet, i.e., an outer magnet 32 is fixed to the handle grip part 2. The outer magnet 32 and the inner magnet 30 in the cartridge 10 generate a mutual attraction due to a magnetic force and the inner magnet 30 in the cartridge 10 is attracted onto the inner wall of the cartridge 10 as shown in FIG. 2B.

In the case of the showerhead having such a structure, when the faucet is opened to allow the flow of water in the supply channel 4, the water flowing in the supply channel 4 rotates the vane wheel 25, which in turn rotates the rotary magnet 28. Then, the vane wheel 29 held in the lower part of the cartridge 10 is rotated along with rotary magnet 28 due to the mutual magnetic attraction. That is, although the cartridge 10 does not rotate, the vane wheel 29 in the inside thereof rotates. As a result, the vitamin C powder 11 in the cartridge 10 and its aqueous solution rotate. The number of revolutions varies depending on the amount of water that flows in the supply channel 4. When the vitamin C powder 11 and its aqueous solution rotate, a centrifugal force is generated, so that the powder 11 and its aqueous solution receive such a force that urges them against the inner surface of the cartridge 10. At this moment, if there is a difference in concentration in the aqueous solution, the aqueous solution having a higher concentration is urged against the inner surface of the cartridge 10 due to a difference in specific gravity.

When the vitamin C powder 11 and its aqueous solution rotate as described above, the inner magnet 30 held in the cartridge 10 is attracted to the inner wall surface of the cartridge 10 by receiving the attractive force by the outer magnet 32 fixed to the handle grip part 2 and comes to a standstill at a position nearest to the outer magnet 32. That is, although the vitamin C powder 11 and its aqueous solution rotate, the inner magnet 30 and the float 31 are prevented from rotating so that the inner magnet 30 and float 31 obstruct the rotation of the vitamin C powder 11 and its aqueous solution. Therefore, as shown in FIG. 2B, the rotation of the vitamin C powder 11 and its aqueous solution is disturbed, with the result that the rotational flow of the aqueous solution is disturbed and thus the aqueous solution is stirred.

For this reason, even if a difference in concentration in the aqueous solution in the cartridge 10 tends to occur, the difference in concentration is resolved by the above-mentioned stirring action to maintain the concentration of the aqueous solution in the cartridge 10 uniform.

At the time of such a water supply as described above, a part of the running water that flows in the supply channel 4 is introduced into the dilution chamber 20 through the sustained release outlet 12 and, at the same time, the aqueous vitamin C solution in the dilution chamber 20 is released to the supply channel 4 through the sustained release outlet 12. The released aqueous vitamin C solution is mixed with the running water flowing in the supply channel 4 and reacts with free residual chlorine contained in the running water to neutralize the free residual chlorine to an innoxious chlorine compound.

On the other hand, the running water that has introduced into the dilution chamber 20 is mixed with the aqueous vitamin C solution therein to decrease the concentration of the aqueous solution. On this occasion, the aqueous vitamin C solution having a higher concentration in the solution holding chamber 21 enters the dilution chamber 20 to replenish the aqueous solution having a higher concentration. As a result, the concentration of vitamin C in the dilution chamber 20 is maintained in a low concentration state.

Furthermore, in the solution holding chamber 21, the aqueous solution having a lower concentration from the dilution chamber 20 is introduced and decreases the concentration of the aqueous solution in the solution holding chamber 21. However, undissolved powder of vitamin C remains in the solution holding chamber 21 and this powder is dissolved. That is, in the solution holding chamber 21, vitamin C is dissolved up to the saturation dissolution concentration, so that a high concentration aqueous solution can be held therein.

From the above, the high concentration aqueous vitamin C solution prepared in the solution holding chamber 21 is supplied to the dilution chamber 20, in which it is diluted with running water to decrease its concentration. The resulting low concentration aqueous solution is released to the supply channel 4 through the sustained release outlet 12.

In the case of the second embodiment as described above, the aqueous solution in the solution holding chamber 21 is rotated but this rotational flow is partly prevented. As a result, the aqueous solution is stirred and the concentration is kept uniform in the solution holding chamber 21. Then, the aqueous solution whose concentration is constantly adjusted to be uniform is supplied to the dilution chamber 20. Thus, the fluctuation in concentration of aqueous solution in the dilution chamber 20 can be prevented so that the concentration of the aqueous solution released to the supply channel 4 can be made uniform.

Other operations are the same as those in the first embodiment described above and explanation thereof is omitted here.

It should be noted that in the second embodiment, it has been designed that the rotation of the driving side rotary magnet 28 produces the rotation of the driven side vane wheel 29 of the cartridge 10, which in turn rotates the content in the cartridge 10, that is, the vitamin C powder 11 and its aqueous solution. However, if it is constructed such that a driven side magnet in place of the driven side vane wheel 29 is fixed to the lower end of the cartridge 10 and the cartridge 10 is rotatably supported, the cartridge 10 itself can rotate due to the rotation of the rotary magnet 28. This can give rotation to the content in the cartridge 10, that is, the vitamin C powder 11 and its aqueous solution.

"Third embodiment"

Next, a third embodiment of the present invention will be illustrated with reference to FIGS. 3 to 6.

In FIGS. 3 to 6, the same or like members as those in FIG. 1 are designated by the same reference numeral and detailed explanation thereof are omitted here. That is, reference numeral 1 designates a showerhead body, 2 designates a handle grip part, 3 designates a head part, 4 designates a supply channel, 5 designates an inlet, 6 designates a water spray plate, 7 designates water spray holes, 8 designates a tap ring, 10 designates a cartridge, 11 designates vitamin C powder, and 12 designates a sustained release outlet.

In the supply channel 4 of the handle grip part 2 is provided swirling flow generating vaned stator 40 positioned below the cartridge 10 in the drawing (on the upstream side in the direction of the flow). The vaned stator 40 causes the running water flowing through the inlet 5 to generate a swirling flow, so that the water that flows into in the supply channel 4 can flow from the upstream side to the downstream side while it is swirling. The vaned stator 40 is provided with a plurality of guide vanes 41 in the circumferential direction. The guide vanes 41 are twisted spirally so that the supplied water is guided by the guide vanes 41 to generate a swirling flow. It should be noted that the swirling flow generating vaned stator 40 is fixed to the inner surface of the handle grip part 2 by use of press fitting, adhesion or other means.

Figure 6:
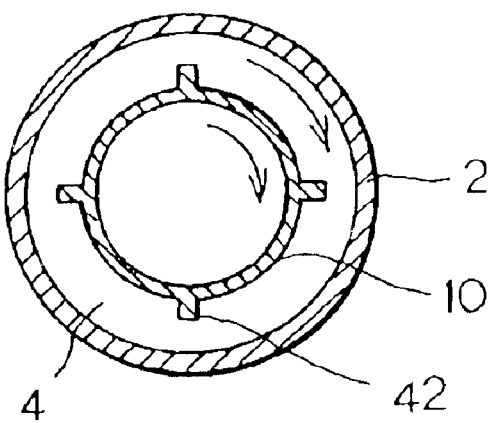
FIG. 6 is a cross-sectional view along the VI—VI line in FIG. 4.

The cartridge 10 is adapted to rotate by receiving a swirling flow of the water in the supply channel 4. The detailed structure of the cartridge 10 will be illustrated with reference to FIG. 4. The cartridge 10 comprises a cartridge body 101 and a cap 102, which are liquid and air tightly coupled to each other. On the lower outer periphery of the cartridge body 101, a plurality of receiving vanes 42 are integrally formed at intervals in the circumferential direction. The receiving vanes 42 receive the above-mentioned swirling flow and may be formed in the form of spirals. In the instant embodiment, however, the receiving vanes 42 are formed in the form of ribs along the axial direction as shown in FIG. 6.

In the center of the lower surface of the cartridge body 101, a lower bearing 43 is integrally formed. The lower bearing 43 is detachably engaged with a lower support shaft 44 projected from and integral to the above-mentioned vaned stator 40. The lower bearing 43 rotatably supports the cartridge 10. In the center of the upper surface of the cap 102, an upper bearing 45 is also integrally formed. The upper bearing 45 is detachably engaged with an upper support shaft 46. The upper support shaft 46 is integrally provided on a holder 47 which is press fitted into or bonded to the upstream side opening of the head part 3.

Therefore, the cartridge 10 is rotatably held on the central axis of the handle grip part 2 as a result of the engagement of the upper and lower bearings 43 and 45, respectively with the support shafts 44 and 46. In the case where the head part 3 is taken out of the handle grip part 2, the cartridge 10 can be taken out through the upper end opening of the handle grip part 2 and the cartridge 10 can be attached again in the handle grip part 2 therethrough.

In the cartridge 10, a water-permeable partition member 48 is provided such that the partition member 48 is positioned in the upper part thereof. For example, the partition member 48 includes a grid-like disk 48a and a mesh sheet 48b such as nonwoven applied to the disk 48a. The partition member 48 partitions the inside of the cartridge 10 into a solution holding chamber 49 in a lower part and a first dilution chamber 50 in an upper part. The powder of vitamin C is held in advance in the solution holding chamber 49 in an excessive amount, for example, with which the chamber 49 is filled up. The solution holding chamber 49 and the first dilution chamber 50 are arranged such that water and the mixing solution can freely pass them through but the powder of vitamin C is stopped by the mesh sheet 48b and prevented from entering the first dilution chamber 50.

Furthermore, a small chamber in the form of a cylinder is formed at a eccentric position from the center on an upper end surface of the cap 102. The small chamber serves as a second dilution chamber 51. The second dilution chamber 51 is communicated with the first dilution chamber 50 and the sustained release outlet 12 is formed on the upper end surface of the second dilution chamber 51.

Moreover, the first dilution chamber 50 and the solution holding chamber 49 hold a first inner magnet 52 and a second inner magnet 53, respectively, as rotation preventing means. The first and second inner magnets 52 and 53 are held in the first dilution chamber 50 and the solution holding chamber 49 such that these magnets 52 and 53 can freely move therein. It should be noted that the second inner magnet 53 is attached to a float 54 and floats in the aqueous solution in the solution containing chamber 49 due to a buoyant force.

Figure 5:
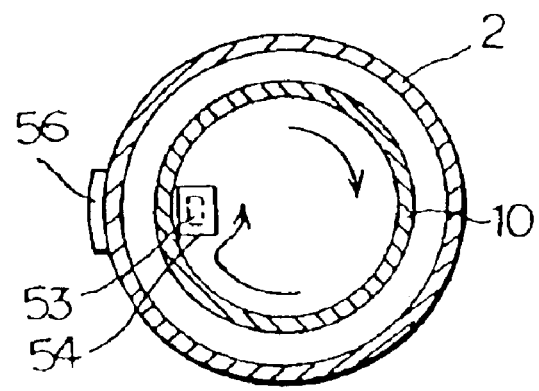
FIG. 5 is a cross-sectional view along the V—V line in FIG. 4.

Opposite to the inner magnets 52 and 53, a first outer magnet 55 and a second outer magnet 56 are fixed to the handle grip part 2. The first and second outer magnets 55 and 56 and the first and second inner magnets 52 and 53 generate attractive force due to mutual magnetic force so that the first and second inner magnets 52 and 53 are attracted onto the inner wall of the cartridge 10 as shown in FIG. 5.

Concerning the third embodiment having such a structure as described above, the action will be illustrated.

When the faucet is opened to allow the flow of water in the supply channel 4, the supplied water flows toward the swirling flow generating vaned stator 40 provided in the vicinity of the inlet 5 and the vaned stator 40 causes the supplied water to generate a swirling flow. The swirling flow runs from the upstream of the supply channel 4 toward the downstream side while it is swirling. As a result, as shown in FIG. 6, the receiving vanes 42 provided on the outer periphery of the lower end part of the cartridge 10 receives the swirling flow to rotate the cartridge 10. Since the upper and lower bearings 43 and 45 of the cartridge 10 are engaged with the support shafts 44 and 46, respectively, the cartridge 10 rotates on the central axis of the handle grip part 2.

As a result, the content of the cartridge 10, i.e., the vitamin C powder 11 and its aqueous solution are rotated in accordance with the rotation of the cartridge 10. When the vitamin C powder 11 and its aqueous solution rotate, a centrifugal force is generated, so that the powder 11 and its aqueous solution receive such a force that urges them against the inner surface of the cartridge 10. At this moment, if there is a difference in concentration in the aqueous solution, the aqueous solution having a higher concentration is urged against the inner surface of the cartridge 10 due to a difference in specific gravity.

However, when the vitamin C powder 11 and its aqueous solution rotate as described above, the first and second inner magnets 52 and 53 held in the cartridge 10 are attracted to the inner wall surface of the cartridge 10 by receiving the attractive force generated by the first and second outer magnets 55 and 56 fixed to the handle grip part 2 and come to a standstill at respective positions nearest to the outer magnets 55 and 56. Therefore, although the vitamin C powder 11 and its aqueous solution rotate, the inner magnets 52 and 53 do not rotate and a part of the rotational flow of the vitamin C powder 11 and its aqueous solution strikes the inner magnets 52 and 53 to prevent the rotational flow. That is, as shown in FIG. 5, the first and second inner magnets 52 and 53 disturb the rotation of the vitamin C powder 11 and its aqueous solution, which in turn disturbs the rotational flow of the aqueous solution, with the result that the aqueous solution is stirred.

As a result, if the aqueous solutions in the solution holding chamber 49 and the first dilution chamber 50 tend to generate a difference in concentration in the vertical direction and in the radial direction thereof, the difference in concentration is canceled by the above-mentioned stirring action so that the concentrations of the aqueous solution in the solutions holding chamber 49 and the first dilution chamber 50 are respectively maintained uniform.

On the other hand, at the time of such a water supply as described above, a part of the running water that flows in the supply channel 4 is introduced into the second dilution chamber 51 through the sustained release outlet 12 and at the same time the aqueous vitamin C solution in the second dilution chamber 51 is released to the supply channel 4 through the sustained release outlet 12. The released aqueous vitamin C solution is mixed with the running water flowing in the supply channel 4 and reacts with free residual chlorine contained in the running water to neutralize the free residual chlorine to an innoxious chlorine compound.

The running water that has introduced into the second dilution chamber 51 is mixed with the aqueous vitamin C solution therein to decrease the concentration of the aqueous solution. On this occasion, the aqueous solution having a medium concentration in the first dilution chamber 50 enters the second dilution chamber 51 to replenish the aqueous solution therein. As a result, the concentration of vitamin C in the second dilution chamber 51 is maintained in a low concentration state.

In addition, in the first dilution chamber 50, the aqueous solution having a lower concentration from the second dilution chamber 51 is introduced thereinto to decrease the concentration of the aqueous solution in the first dilution chamber 50. Since the first dilution chamber 50 is communicated with the solution holding chamber 49, the aqueous solution having a higher concentration diffuses from the solution holding chamber 49 and enters the first dilution chamber 50. As a result, an aqueous solution having a medium concentration is pooled in the first dilution chamber 50.

Furthermore, the aqueous solution having a lower concentration from the first dilution chamber 50 is introduced into the solution holding chamber 49 to decrease the concentration of the solution therein. Since undissolved powder of vitamin C remains in the solution holding chamber 49, this powder is dissolved. That is, in the solution holding chamber 49, vitamin C is dissolved up to the saturation dissolution concentration thereof, so that a high concentration aqueous solution can be pooled therein.

From the above, it follows that the high concentration aqueous vitamin C solution prepared in the solution holding chamber 49 is supplied to the first dilution chamber 50, in which it is diluted to a medium concentration and is pooled therein. The resulting aqueous solution having a medium concentration is supplied to the second dilution chamber 51, in which it is diluted to a low concentration and is pooled therein. Therefore, a low concentration aqueous solution is released to the supply channel 4 through the sustained release outlet 12.

In the case of the third embodiment as described above, the aqueous solutions in the solution holding chamber 49 and the first dilution chamber 50 are rotated but this rotation is partly obstructed by the inner magnets 52 and 53. As a result, the aqueous solutions are stirred and the concentrations thereof are kept uniform in the solution holding chamber 49 and the first dilution chamber 50. Then, since the aqueous solution whose concentration is adjusted to be uniform is supplied to the second dilution chamber 51, the fluctuation in concentration of the solution in the second dilution chamber 51 can be prevent, so that the fluctuation in the concentration of the aqueous solution released to the supply channel 4 can be reduced.

It should be noted that other actions are the same as those in the first embodiment described above and explanation thereof is omitted here.

In the first to third embodiments as described above, explanation has been made on the case where the present invention is applied to a showerhead. However, the present invention may also be practiced for a feed device and the like as a fourth embodiment as shown in FIGS. 7 and 8.

Figure 8:
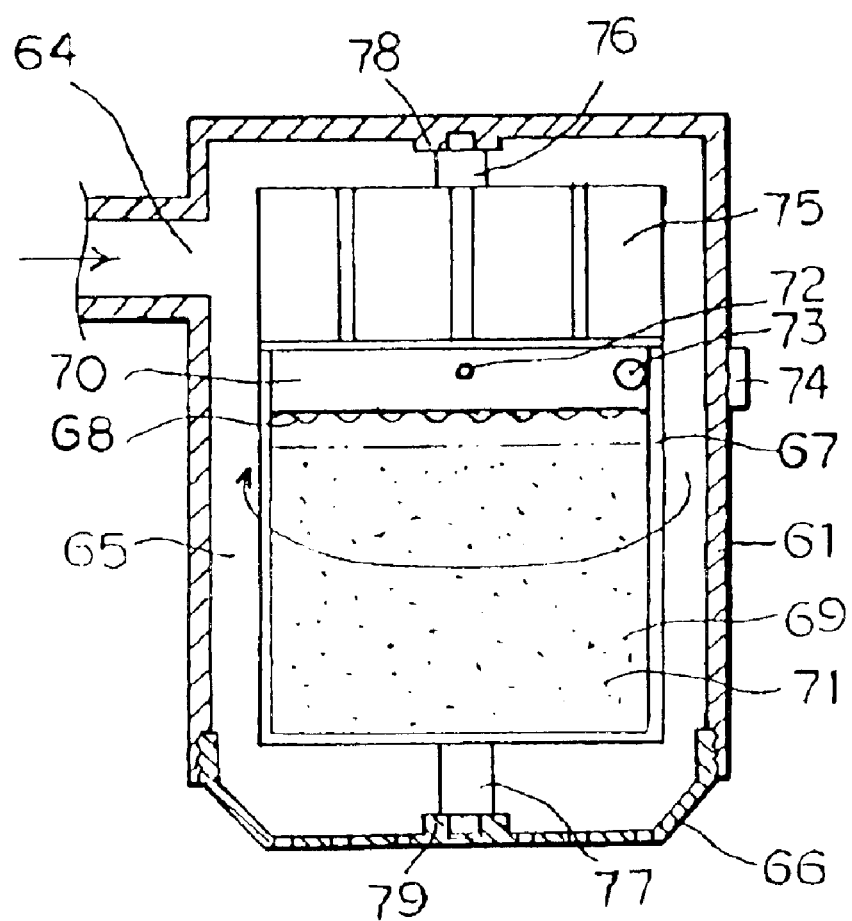
FIG. 8 is a cross-sectional view showing the fourth embodiment.

The feed device shown in FIGS. 7 and 8 includes a feed body 61 made of a transparent resin, which is connected through a conducting tube 62 to a bibcock 63. The conducting tube 62 is communicated with an inlet 64 formed on a side of an upper part of the feed device 61. The feed device 61 is in the form of a cylinder having an opening on its lower end and has formed therein a supply channel 65 that is communicated with the inlet 64 and with the lower end discharge opening. A water spray plate 66 is detachably fitted to the lower end discharge opening of the body 61 by use of threaded fitting or other means.

In the supply channel 65, a cartridge 67 is held. The cartridge 67 is formed in the form of a cylinder of a sealed structure and is transparent so that the inside can be seen.

The inside of the cartridge 67 is partitioned by a water-permeable partition member 68 into upper and lower parts. A solution holding chamber 69 is formed below the partition member 68 and a dilution chamber 70 is formed above the partition member 68. In the solution holding chamber 69 is held vitamin C in the form of powder 71. A single sustained release outlet 72 is positioned in an upper end portion of the cartridge 67, i.e., an upper end part of the dilution chamber 70 and formed on a circumferential surface thereof. The sustained release outlet 72 is designed so as to have an opening area of 1.0 mm² or less, preferably 0.5 mm² or less and 0.03 mm² or more.

In the dilution chamber 70, an inner magnet 73 is movably held. In Opposite thereto, an outer magnet 74 is fixed to a side of the feed device 61. The inner magnet 73 and the outer magnet 74 constitute a rotation preventing means.

In the upper end of the cartridge 67, a vaned rotor 75 is integrally formed. On both ends of the cartridge 67 with the vaned rotor 75, shafts 76 and 77 are formed as shown in FIG. 8. The shafts 76 and 77 are detachably fitted to bearings 78 and 79 provided in the ceiling of the feed body 61 and in the center of the water spray plate 66, respectively. The water that flows into from the inlet 64 rotates the vaned rotor 75, which in turn rotates the cartridge 67 unitarily.

It should be noted that the supply channel is secured between the outer peripheral surface of the cartridge 67 and the inner peripheral surface of the feed body 61, and also that the cartridge 67 and the vaned rotor 75 can be exchanged from the lower end of the feed body 61 by taking off the water spray plate 66.

In the feed device having such a construction as described above, when the feed device is used for the first time, the air in the cartridge 67 is quickly expelled through the sustained release outlet 72 since the sustained release outlet 72 is formed in the upper end part of the cartridge 67 so that water can be introduced into the cartridge 67.

In addition, during ordinary water supply, the water that flows into from the inlet 64 rotates the vaned rotor 75, which in turn rotates the cartridge 67 unitarily. Therefore, the vitamin C powder 71 and its aqueous solution held in the solution holding chamber 69 as well as the aqueous solution in the dilution chamber 70 are rotated along with the cartridge 67, and thus generate a centrifugal force. On this occasion, the inner magnet 73 held in the dilution chamber 70 receives the magnetic force of the outer magnet 74 fixed to the side surface of the feed body 61 to be prevented from rotating, so that the rotation of the aqueous solution is partly obstructed. As a result, the concentration of the aqueous solution in the dilution chamber 70 is made uniform. The aqueous solution is released to the supply channel 65 through the sustained release outlet 72 and, at the same time, a part of, the running water in the supply channel 65 is introduced into the dilution chamber 70.

Then, the aqueous solution having a lower concentration in the dilution chamber 70 is introduced into the solution holding chamber 69 and the aqueous solution having a higher concentration in the solution holding chamber 69 flows into the dilution chamber 70. That is, replacement occurs in the same manner as in the case of the showerhead as described above, so that an aqueous solution having a low concentration can be pooled in the dilution chamber 70 with a difference in concentration being maintained uniform.

When the water supply is stopped, a leakage of the aqueous vitamin C solution through the sustained release outlet 72 can be minimized since the sustained release outlet 72 is formed in the upper part of the cartridge 67.

Therefore, also in the case of such a construction as described above, the vitamin C held in the cartridge 57 can be sustainedly released in a minimal necessary amount, so that vitamin C can be used efficiently with reducing unnecessary consumption and the service life of a cartridge can be prolonged.

It should be noted that the cartridge provided integrally with the vaned rotor shown in FIGS. 7 and 8 may be held in the head part 3 of the showerhead shown in FIG. 1. In such a case, the head part of the showerhead can be efficiently utilized.

What is claimed is:

1. A feed device having a function of sustained release for a mixing solution, said feed device comprising:

a feed body including an inlet, an outlet and a supply channel defined between the inlet and the outlet;

a solution holding chamber for holding a mixing solution to be mixed with water flowing in the supply channel;

a dilution chamber, which communicates with said solution holding chamber to guide the mixing solution from said solution holding chamber, and which includes a sustained release outlet, such that the dilution chamber introduces therein a part of the water flowing in the supply channel through the sustained release outlet, dilutes the mixing solution with the introduced water into a lower concentration solution, and feeds the lower concentration solution through the sustained release outlet to the supply channel; and a partition plate for partitioning said solution holding chamber and said dilution chamber, wherein said partition plate allows the mixing solution to permeate between said chambers mutually.

2. The feed device according to claim 1, wherein said feed device further comprises a cartridge which comprises said solution holding chamber, the dilution chamber and the sustained release outlet, and wherein said cartridge is detachably attached to said feed body.

3. The feed device according to claim 2, wherein said feed device further comprises a stirring mechanism for stirring the mixing solution inside at least one of said solution holding chamber and said dilution chamber.

4. The feed device according to claim 3, wherein said stirring mechanism comprises:

means for giving a rotational movement to the mixing solution in at least one of said solution holding chamber and said dilution chamber by use of flow energy of the water flowing in the supply channel, and rotational resistance means for giving rotational resistance to a part of the mixing solution being rotated.

5. The feed device according to claim 4, wherein said means for giving a rotational movement to the mixing solution comprises:

a driving rotor rotated by the flow energy of the water flowing in the supply channel, and a driven rotor rotated along with said driving rotor in one of said solution holding chamber and said dilution chamber so that the mixing solution is rotated.

6. The feed device according to claim 5, wherein said rotation resistance means for giving a rotation resistance to a part of the rotated mixing solution comprises:

a first magnetic material or magnet movably held in at least one of said solution holding chamber and said dilution chamber; and a second magnetic material or magnet fixed to said feed body, whereby said first magnetic material or magnet in said at least one of said solution holding chamber and said dilution chamber is not rotated along with the mixing solution by mutually attracting or repelling with respect to said second magnetic material or magnet on said feed body due to magnetic force acting therebetween when the mixing solution is rotated in said at least one of said solution holding chamber and said dilution chamber.

7. The feed device according to claim 4, wherein said means for giving a rotational movement to the mixing solution rotates, by the flow energy of the water flowing in the supply channel, all of the cartridge so as to give the mixing solution a follow-up rotation.

8. The feed device according to claim 7, wherein said means for giving rotational movement to the mixing solution comprises:
   a swirling flow generation mechanism for generating a swirling flow in the supply channel by use of the flow energy of the water flowing in the supply channel; and
   receiving vanes provided on said cartridge, said receiving vanes causing said cartridge to be rotated by receiving the swirling flow.

9. The feed device according to claim 8, wherein said rotation resistance means for giving a rotation resistance to a part of the rotated mixing solution comprises:
   a first magnetic material or magnet movably held in at least one of said solution holding chamber and said dilution chamber; and
   a second magnetic material or magnet fixed to said feed body,
   whereby said first magnetic material or magnet in said cartridge, at least one of said solution holding chamber and said dilution chamber is not rotated along with the mixing solution by mutually attracting or repelling with respect to said second magnetic material or magnet on said feed body due to magnetic force acting therebetween when the mixing solution is rotated in said at least one of said solution holding chamber and said dilution chamber.

10. The feed device according to claim 7, wherein said rotation resistance means for giving a rotation resistance to a part of the rotated mixing solution comprises:
    a first magnetic material or magnet movably held in at least one of said solution holding chamber and said dilution chamber; and
    a second magnetic material or magnet fixed to said feed body,
    whereby said first magnetic material or magnet in said at least one of said solution holding chamber and said dilution chamber is not rotated along with the mixing solution by mutually attracting or repelling with respect to said second magnetic material or magnet on said feed body due to magnetic force acting therebetween when the mixing solution is rotated in said at least one of said solution holding chamber and said dilution chamber.

11. The feed device according to claim 7, wherein said means for giving rotational movement to the mixing solution comprises:
    a swirling flow generation mechanism for generating a swirling flow in the supply channel by use of the flow energy of the water flowing in the supply channel; and
    receiving vanes provided on said cartridge, said receiving vanes causing said cartridge to be rotated by receiving the swirling flow.

12. The feed device according to claim 4, wherein said rotation resistance means for giving a rotation resistance to a part of the rotated mixing solution comprises:
    a first magnetic material or magnet movably held in at least one of said solution holding chamber and said dilution chamber; and
    a second magnetic material or magnet fixed to said feed body,
    whereby said first magnetic material or magnet in said at least one of said solution holding chamber and said dilution chamber is not rotated along with the mixing solution by mutually attracting or repelling with respect to said second magnetic material or magnet on said feed body due to magnetic force acting therebetween when the mixing solution is rotated in said at least one of said solution holding chamber and said dilution chamber.

13. The feed device according to claim 2, wherein said cartridge is detachably attached in the supply channel.

14. The feed device according to claim 2, wherein said sustained release outlet has an opening area set to not more than $1.0$ mm$^2$.

15. The feed device according to claim 2, wherein at least a part of said mixing solution holding chamber is translucent, and at least a part of said feed body is translucent, such that at least a part of an inside of said solution holding chamber is visible from outside of said feed body.

16. The feed device according to claim 2, wherein said feed body comprises a showerhead, the inlet is connected to a shower hose, and the outlet is provided with a water spray plate.

17. The feed device according to claim 1, wherein the mixing solution has a specific gravity greater than a specific gravity of water, and said sustained release outlet is formed in an upper position of said dilution chamber when a head part of said device is above a lower part of said device and a water supply is stopped.

18. The feed device according to claim 1, wherein said mixing solution holding chamber contains one of powder, granules and pellets as a dissoluble source for a mixing solution, and the one of the powder, granules and pellets is dissolved in water to produce the mixing solution.

19. The feed device according to claim 18, wherein the one of the powder, granules and pellets as a dissoluble source for the mixing solution are held in an amount which is more than an amount of the one of the powder, granules and pellets which is dissolved by water initially filled in said mixing solution holding chamber.

20. The feed device according to claim 18, wherein the mixing solution includes L-ascorbic acid or ascorbic acids.

21. A feed device having a function of sustained release for a mixing solution, said feed device comprising:
    a feed body having an inlet, an outlet and a supply channel defined between the inlet and the outlet;
    a cartridge for holding a mixing solution to be mixed with water flowing in the supply channel, which includes a sustained release outlet communicating with the supply channel, whereby said cartridge introduces therein a part of the water flowing in the supply channel through the sustained release outlet and feeds the mixing solution therefrom into the supply channel through the sustained release outlet; and
    a stirring mechanism for stirring the mixing solution held in said cartridge.

22. The feed device according to claim 21, wherein said cartridge is detachably attached in the supply channel.

23. The feed device according to claim 21, wherein said stirring mechanism comprises:

means for giving a rotational movement to the mixing solution in said cartridge by use of flow energy of the water flowing in the supply channel, and rotational resistance means for giving rotational resistance to a part of the mixing solution being rotated.

24. The feed device according to claim 23, wherein said rotation resistance means for giving a rotation resistance to a part of the rotated mixing solution comprises:

a first magnetic material or magnet movably held in said cartridge; and a second magnetic material or magnet fixed to said feed body, whereby said first magnetic material or magnet in said cartridge is not rotated along with the mixing solution by mutually attracting or repelling with respect to said second magnetic material or magnet on said feed body due to magnetic force acting therebetween when the mixing solution is rotated in said cartridge.

25. The feed device according to claim 23, wherein said means for giving a rotation movement to the mixing solution comprises:

a driving rotor rotated by the flow energy of the water flowing in the supply channel; and a driven rotor rotated along with the driving rotor in the cartridge so that the mixing solution is rotated.

26. The feed device according to claim 23, wherein said means for giving a rotational movement to the mixing solution rotates, by the flow energy of the water flowing in the supply channel, all of the cartridge so as to give the mixing solution a follow-up rotation.

27. The feed device according to claim 21, wherein the mixing solution has a specific gravity greater than a specific gravity of water, and said sustained release outlet is formed in an upper position of said dilution chamber when a head part of said device is above a lower part of said device and a water supply is stopped.

28. The feed device according to claim 21, wherein said sustained release outlet has an opening area set to not more than 1.0 mm$^2$.

29. The feed device according to claim 21, wherein said cartridge contains one of powder, granules and pellets as a dissoluble source for a mixing solution, and the one of the powder, granules and pellets is dissolved in water to produce the mixing solution.

30. The feed device according to claim 29, wherein the mixing solution includes L-ascorbic acid or ascorbic acids.

31. The feed device according to claim 29, wherein the one of the powder, granules and pellets as a dissoluble source for the mixing solution are held in an amount which is more than an amount of the one of the powder, granules and pellets which is dissolved by water initially filled in said mixing solution holding chamber.

32. The feed device according to claim 21, wherein at least a part of said cartridge is translucent, and at least a part of said feed body is translucent, such that at least a part of an inside of said cartridge is visible from outside of said feed body.

33. The feed device according to claim 21, wherein said feed body comprises a showerhead, the inlet is connected to a shower hose, and the outlet is provided with a water spray plate.

* * * * *